United States Patent
Jacobs (12)

(10) Patent No.: US 9,969,091 B2
(45) Date of Patent: May 15, 2018

(54) SAFETY UTILITY BLADES, ASSEMBLIES AND METHODS OF MANUFACTURING

(71) Applicant: KLEVER KUTTER LLC, Grand Haven, MI (US)

(72) Inventor: Matthew J. Jacobs, Grand Haven, MI (US)

( * ) Notice: Subject to any disclaimer, the term of this patent is extended or adjusted under 35 U.S.C. 154(b) by 176 days.

(21) Appl. No.: 15/014,062

(22) Filed: Feb. 3, 2016

(65) Prior Publication Data

US 2017/0217029 A1 Aug. 3, 2017

(51) Int. Cl.
*B26B 5/00* (2006.01)
*B23P 15/28* (2006.01)
*B26B 9/00* (2006.01)

(52) U.S. Cl.
CPC ............... *B26B 5/00* (2013.01); *B23P 15/28* (2013.01); *B26B 9/00* (2013.01)

(58) Field of Classification Search
CPC ... B23P 15/28; B26B 5/00; B26B 5/06; B26B 9/00
See application file for complete search history.

(56) References Cited

U.S. PATENT DOCUMENTS

| | | | | |
|---|---|---|---|---|
| 3,845,554 A | * | 11/1974 | Joanis | B26B 5/00 30/125 |
| 6,691,416 B2 | * | 2/2004 | Yu Chen | B26B 3/00 30/125 |
| 8,448,544 B2 | * | 5/2013 | Howells | B26B 9/00 148/567 |
| 8,782,909 B1 | * | 7/2014 | Davis | B26B 5/003 30/2 |
| 8,914,982 B1 | * | 12/2014 | Skluzak | B26B 5/00 30/337 |
| 9,539,732 B2 | * | 1/2017 | Segler | B26B 5/00 |
| 2005/0278955 A1 | * | 12/2005 | Lee | B26B 1/02 30/153 |
| 2010/0263219 A1 | * | 10/2010 | Kempker | B25F 1/02 30/337 |
| 2010/0293796 A1 | * | 11/2010 | Votolato | B26B 29/00 30/287 |
| 2012/0180326 A1 | * | 7/2012 | Wu | B26B 1/042 30/337 |
| 2013/0298409 A1 | * | 11/2013 | Jacobs | B26B 5/00 30/314 |
| 2014/0216605 A1 | * | 8/2014 | Batty | B27G 15/00 142/56 |
| 2017/0217029 A1 | * | 8/2017 | Jacobs | B26B 5/00 |

* cited by examiner

*Primary Examiner* — Hwei C Payer
(74) *Attorney, Agent, or Firm* — James E. Shultz, Jr.

(57) ABSTRACT

The present disclosure relates to safety blades for use in utility knives, related assemblies and methods of manufacturing. More specifically, the present disclosure relates to safety blades for use in utility knives, related assemblies and methods of manufacture which limit user exposure to associated cutting edges.

20 Claims, 11 Drawing Sheets

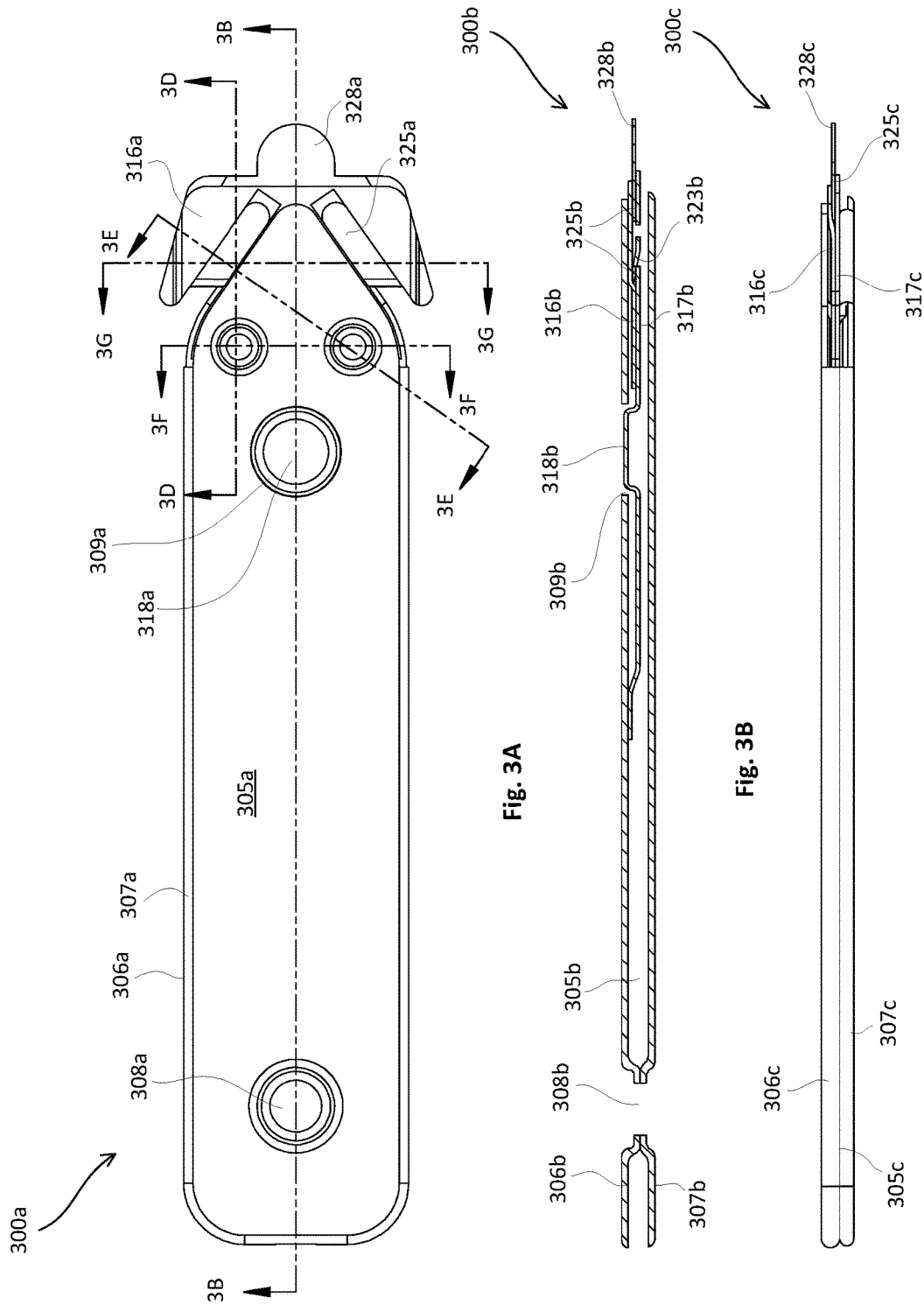

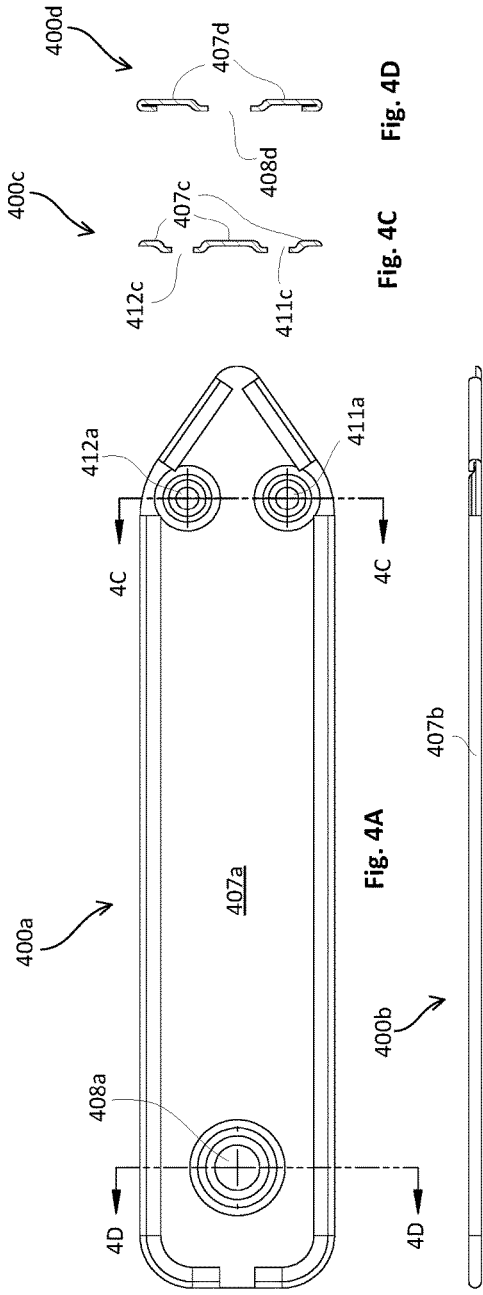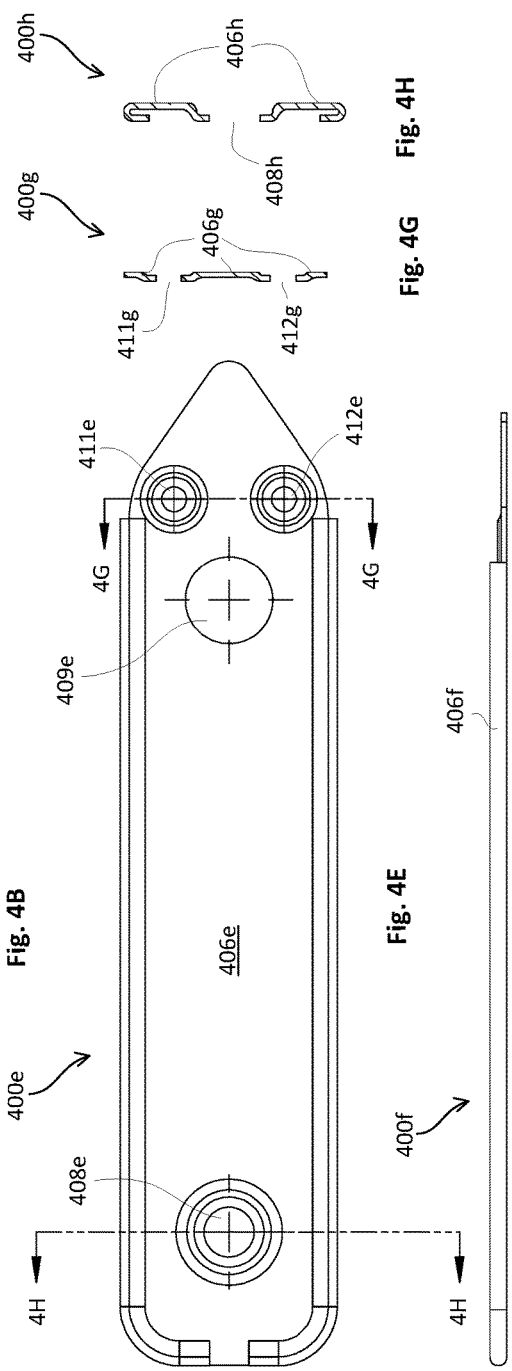

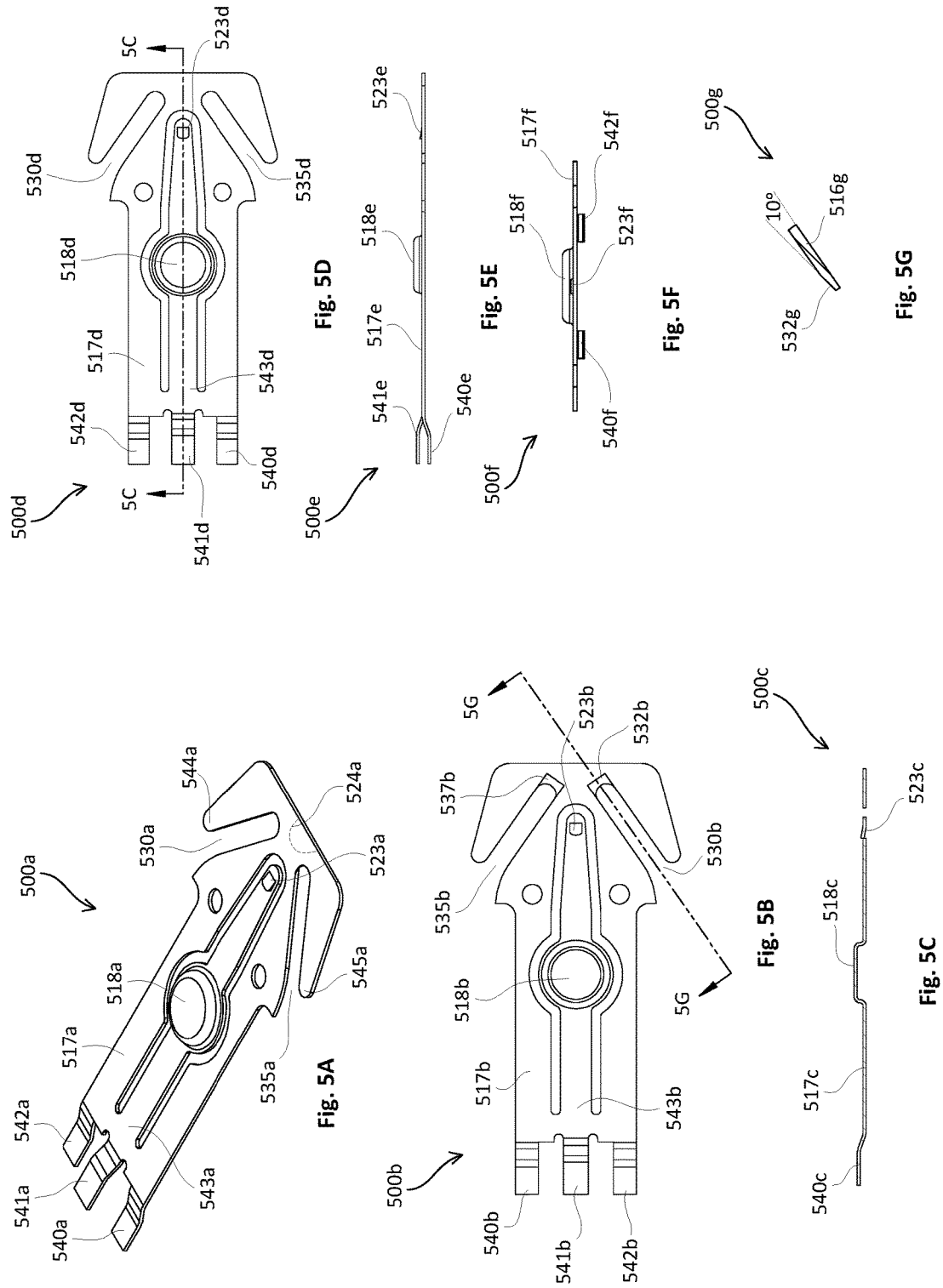

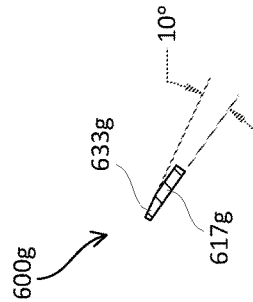
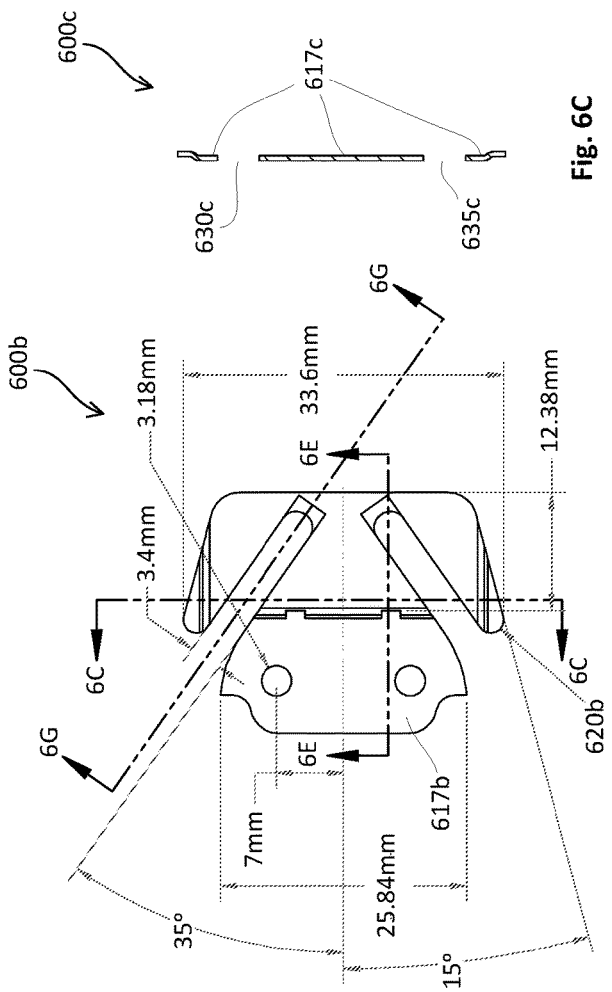
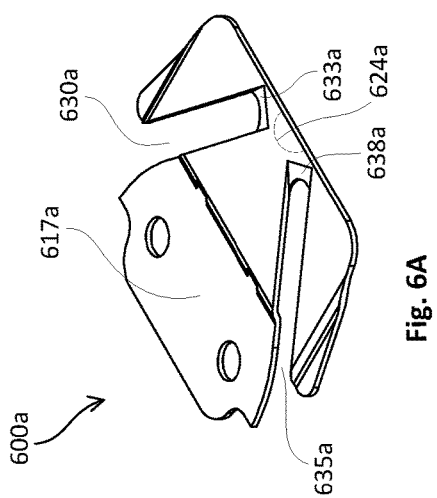
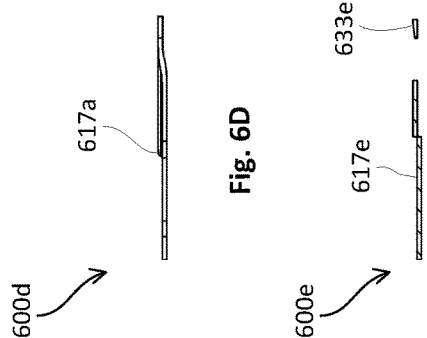
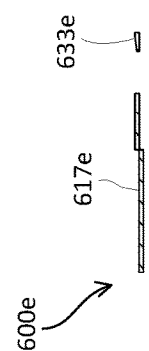

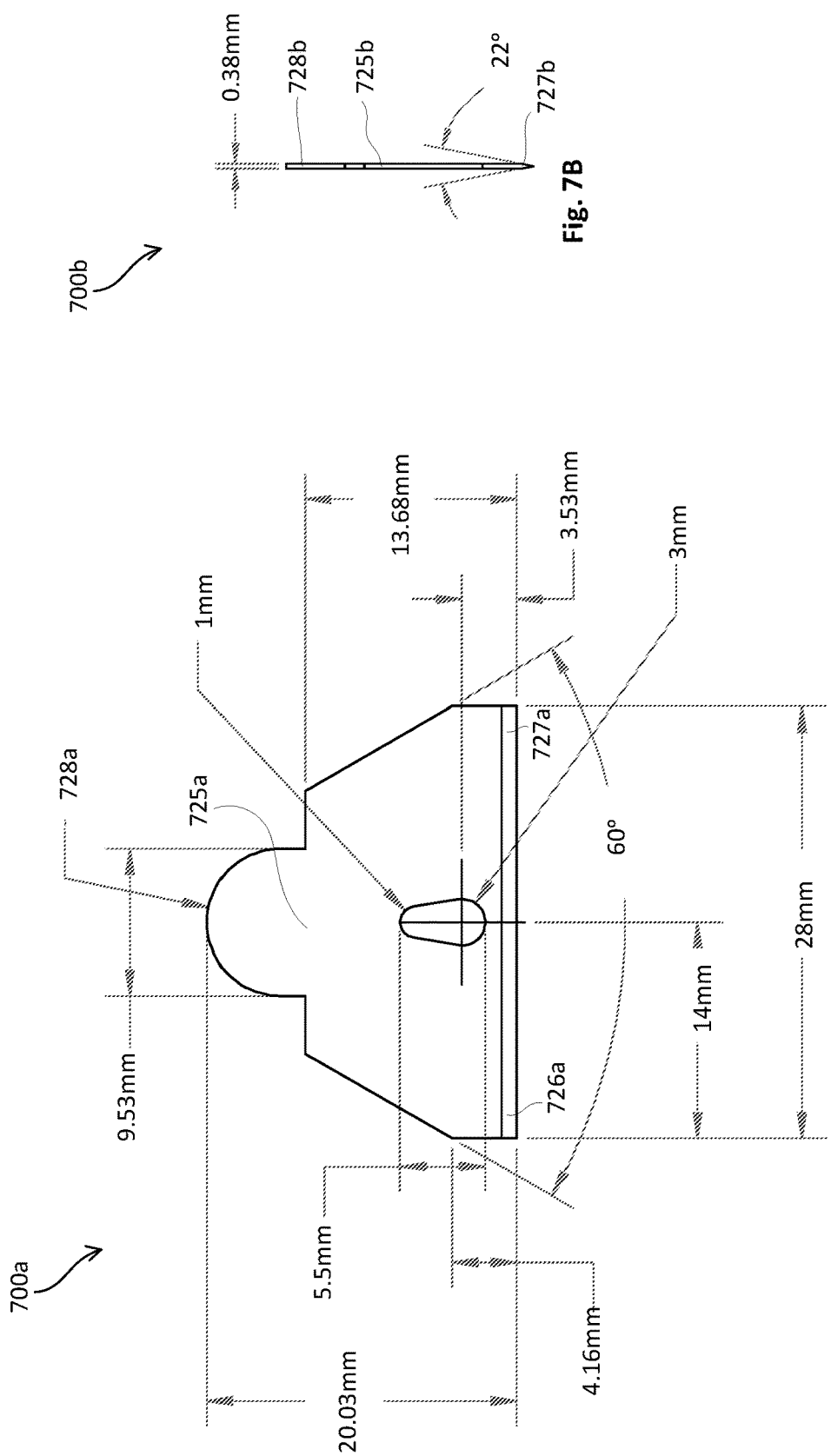

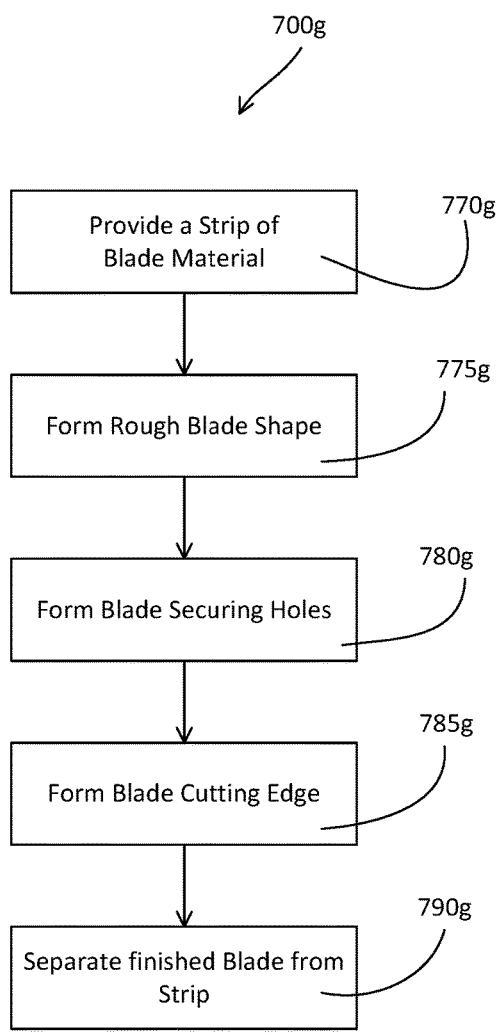
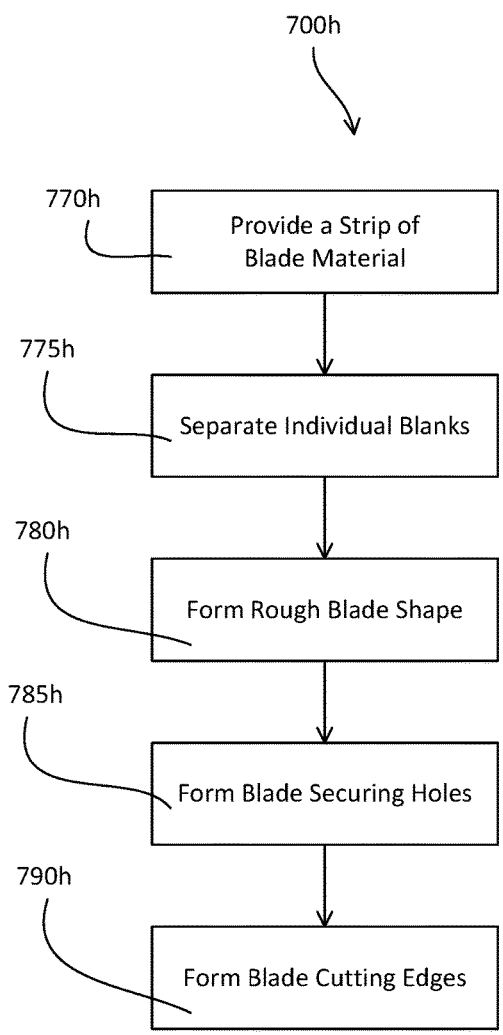
Fig. 7G
Fig. 7H

SAFETY UTILITY BLADES, ASSEMBLIES AND METHODS OF MANUFACTURING

FIELD OF THE INVENTION

The present disclosure relates to safety blades for use in utility knives, related assemblies and methods of manufacturing. More specifically, the present disclosure relates to safety blades for use in utility knives, related assemblies and methods of manufacture which limit user exposure to associated cutting edges.

BACKGROUND

Utility knives are used for a host of purposes, such as opening cardboard boxes, cutting sheet material, cutting web material, opening packages, etc. Injuries to the users of utility knifes are all too common due to inadvertent contact with cutting edges of associated blades. Injuries may be particularly severe when a given utility knife includes a standard razor blade. Even standard, single edge, razor blades are dangerous.

Inadvertent contact with cutting edges of blades can be equally common during blade removal, insertion and handling. Inadvertent contact with the cutting edges is particularly problematic when a user is removing or inserting a double edge razor blade, or a single edge razor blade without a gripping tab, into an associated utility knife.

Blades for use in utility knives, and utility knives which limit user exposure to the associated cutting edges, are desirable. Methods of manufacturing related blades and utility knives are also desirable.

SUMMARY

A safety utility knife assembly may include a handle having a blade retainer receptacle and a blade retainer having a blade release mechanism and a blade catch, wherein the blade retainer includes a first half and a second half. The safety utility knife assembly further includes a replaceable safety blade having a blade tab and a blade securing aperture. A cutting edge of the replaceable safety blade extends perpendicular to a longitudinally extending axis of the handle. The replaceable safety blade is secured to the safety utility knife when the blade catch is engaged with the blade securing aperture. The replaceable safety blade is removable from the safety utility knife, when a user presses on the blade release mechanism and the blade catch is disengaged from the blade securing aperture.

In another embodiment, a method of manufacturing a replaceable safety blade for use within a safety utility knife assembly may include providing a strip of blade material and forming a rough blade shape from the strip of blade material. The rough blade shape may include a blade tab and a blade securing aperture. The method may further include forming a blade cutting edge in the rough blade shape.

In a further embodiment, a safety utility knife assembly may include a handle and a blade retainer having a blade release mechanism and a blade catch. The safety utility knife may further include a replaceable safety blade having a blade tab and a blade securing aperture. A cutting edge of the replaceable safety blade extends perpendicular to a longitudinally extending axis of the handle. The replaceable safety blade is secured to the safety utility knife when the blade catch is engaged with the blade securing aperture. The replaceable safety blade is removable from the safety utility knife, when a user presses on the blade release mechanism and the blade catch is disengaged from the blade securing aperture.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE FIGURES

FIGS. 3A-3H depict various views and detail of the safety utility knife assembly of FIGS. 1 and 2;

FIGS. 4A-4H depict various views and detail of an example handle for use within the safety utility knife assembly of FIGS. 1 and 2;

FIGS. 5A-5G depict various views and detail of an example bottom half of a blade retainer for use within the safety utility knife assembly of FIGS. 1 and 2;

FIGS. 6A-6G depict various views and detail of an example top half of a blade retainer for use within the safety utility knife assembly of FIGS. 1 and 2;

FIGS. 7A and 7B depict various views and detail of an example safety blade for use within the safety utility knife assembly of FIGS. 1 and 2; and FIGS. 7C-7H depict example manufacturing methods for fabrication of the safety blade of FIGS. 7A and 7B.

DETAILED DESCRIPTION

The safety utility blades and safety utility knife assemblies of the present disclosure may incorporate various features that limit user exposure to associated cutting edges. The manufacturing methods of the present disclosure may be used to produce the disclosed safety utility blades and safety utility knife assemblies.

Figure 1:
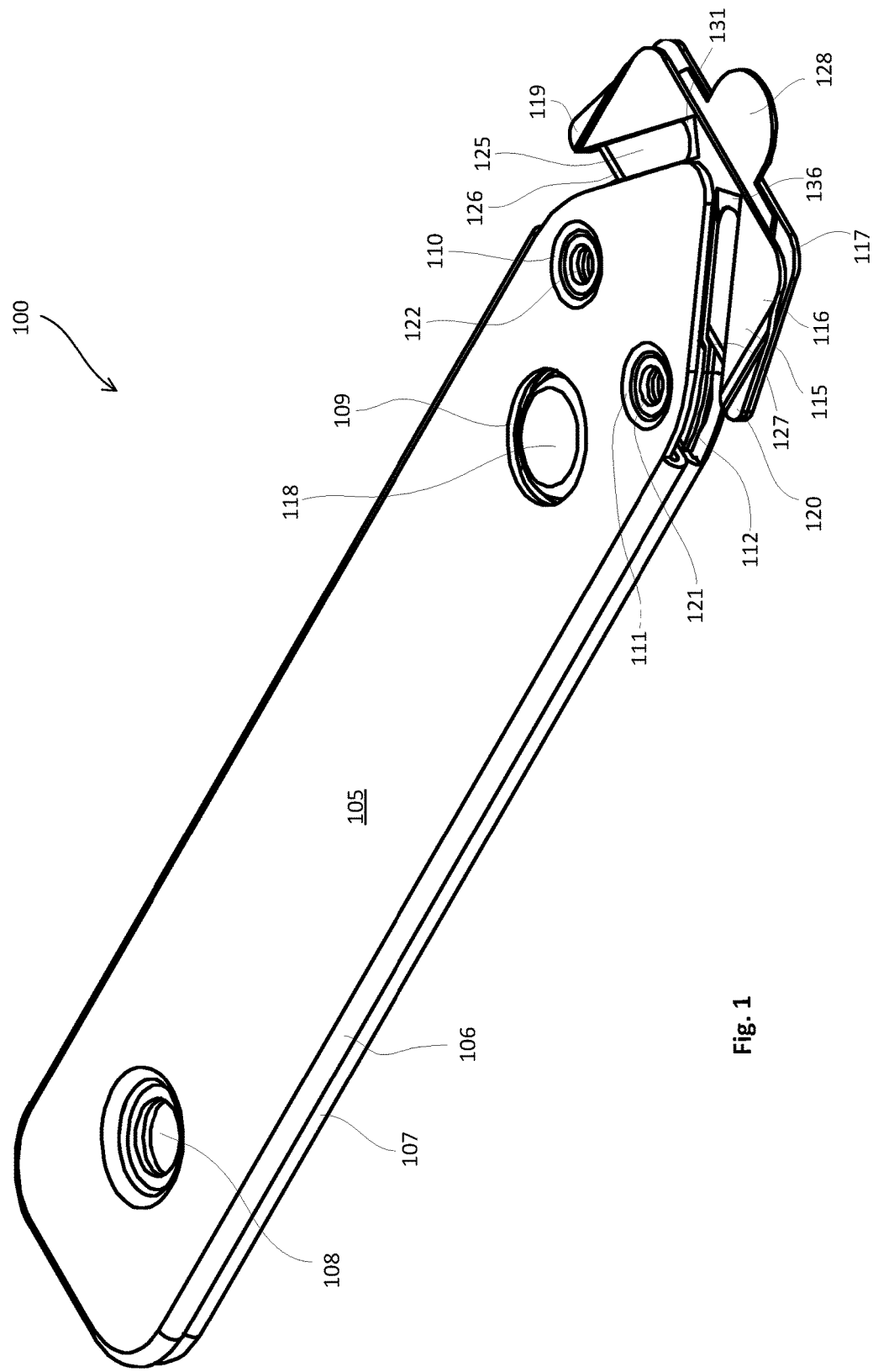
FIGS. 1 and 2 depict an example safety utility knife assembly.

With initial reference to FIG. 1, a safety utility knife assembly 100 may include a replaceable safety blade 125. As described in detail herein, the replaceable safety blade 125 may be inserted into a blade retainer 115 which, in turn, may be inserted into a blade retainer receptacle 112 of an associated handle 105. The safety utility knife 100 may include a blade release button 118. The replaceable safety blade 125 may include a blade tab 128. A user may remove the replaceable safety blade 125 from the safety utility knife assembly 100 by, for example, grasping the blade tab 128, pressing the button 118, and pulling the replaceable safety blade 125 from the blade retainer 115.

The handle 105 may include a first half 106 secured to a second half 107 forming, for example, the blade retainer receptacle 112 in one end for receiving a blade retainer 115. The handle 105 may include an aperture 108 for hanging the safety utility knife assembly 100 on, for example, a peg or hanger of some sort. Alternatively, or additionally, the safety utility knife assembly 100 may be secured to a clip of, for example, a lanyard, a strap, a key chain, etc. (not shown). The handle 105 may include blade retainer receptacles 110, 111 configured to receive, for example, blade retainer snaps 121, 122, respectively. The blade retainer 115 may include a first half 116 and a second half 117. The first half 116 of the blade retainer 115 may include a first blade end offset 119, a second blade end offset 120, a first wedge 131, and a second wedge 136. The first wedge 131 and the second wedge 136 may be configured to, for example, prevent, or minimize, material buildup. The safety utility blade 125 may include a first cutting edge 126 and a second cutting edge 127. Alternatively, the first and second cutting edges 126, 127 of a safety utility blade 125 may define a single, continuous, cutting edge. Further details of the handle 105, the blade retainer 115, and the replaceable safety blade 125 are described throughout this disclosure.

Advantageously, when either of the first or second cutting edge 126, 127 becomes dull, or worn, a user may simply flip the safety utility knife assembly 100 over and use the other cutting edge 126, 127. When both the first cutting edge 126 and the second cutting edge 127 are dull, or worn, a user may simply replace the replaceable safety blade 125 while reusing other components (e.g., handle 105 and safety utility blade retainer 115) of the safety utility knife assembly 100.

Figure 2:
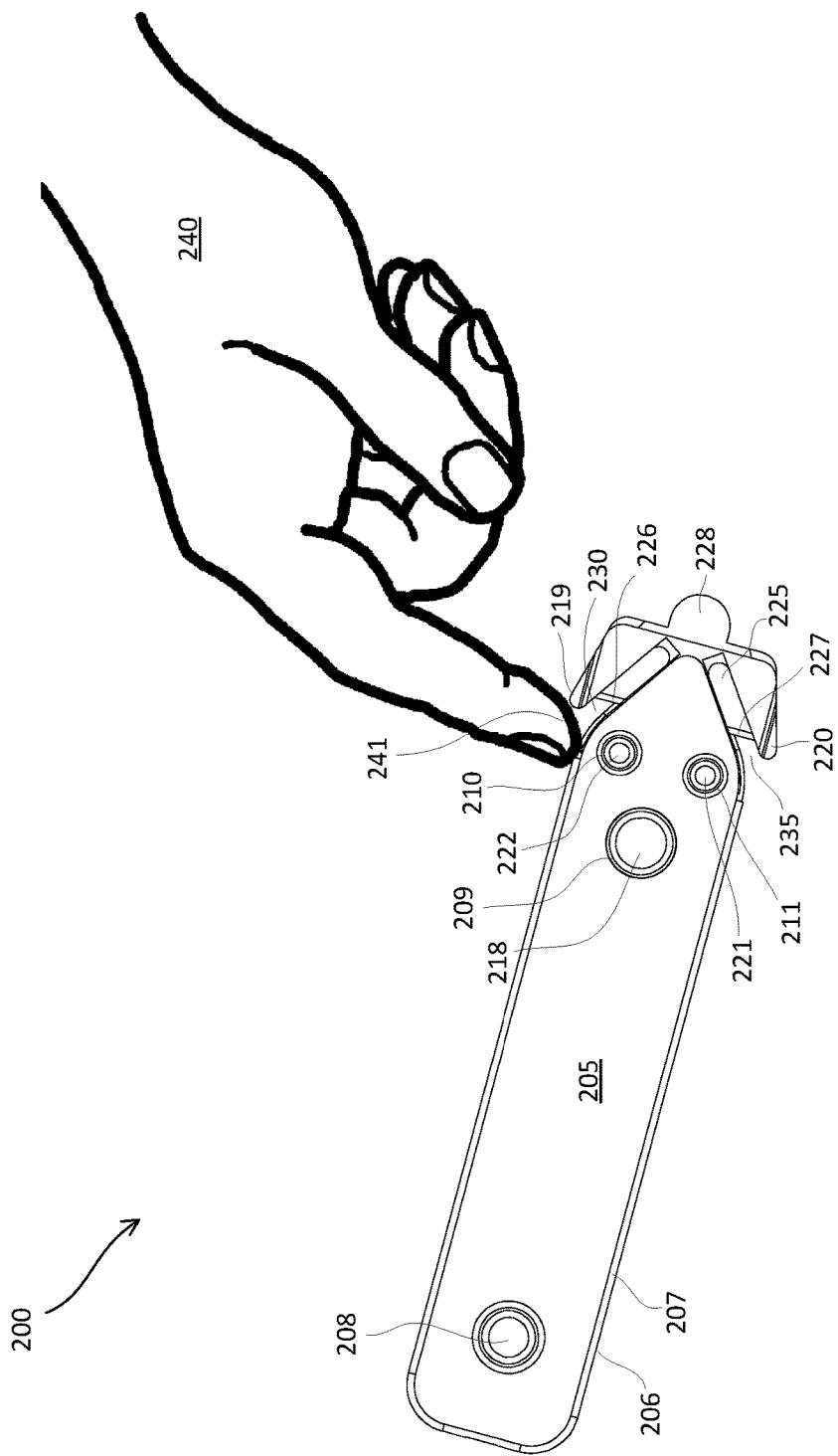

Turning to FIG. 2, a safety utility knife assembly 200 may include a first blade throat 230 defined by a first blade retainer tip 219 and a proximate portion of a blade handle 205. The safety utility knife assembly 200 may be similar to, for example, the safety utility knife 100 of FIG. 1. In any event, the safety utility knife assembly 200 may include a second blade throat 235 defined by a second blade retainer tip 220 and a proximate portion of a blade handle 205. The first blade throat 230 may be configured to, for example, limit access of a finger 241 of a hand 240 of a user to a first cutting edge 226 of an associated blade 225. Similarly, the second blade throat 235 may be configured to limit exposure to a second cutting edge 227.

The safety utility knife assembly 200 may include a blade release button 218. The replaceable safety blade 225 may include a blade tab 228. A user may remove the replaceable safety blade 225 from the safety utility knife assembly 200 by, for example, grasping the blade tab 228, pressing the button 218, and pulling the replaceable safety blade 225 from the blade handle 205. The handle 205 may include a first half 206 secured to a second half 207 for receiving a replaceable safety blade 225. The handle 205 may include an aperture 208 for hanging the safety utility knife assembly 200 on, for example, a peg or hanger of some sort. Alternatively, or additionally, the safety utility knife assembly 200 may be secured to a clip of, for example, a lanyard, a strap, a keychain, etc. (not shown). The handle 205 may include blade retainer receptacles 210, 211 configured to receive, for example, blade retainer snaps 221, 222, respectively. Further details of the handle 205 and the replaceable safety blade 225 are described throughout this disclosure.

Figure 3F:
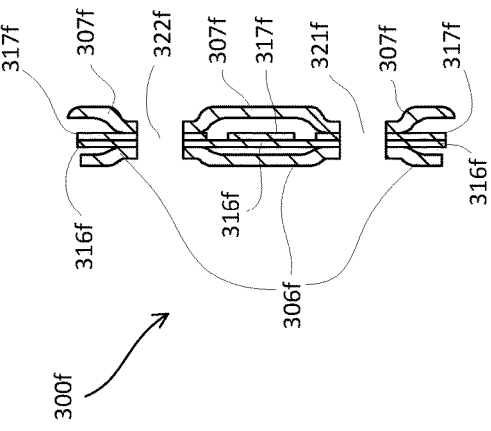
Figure 3G:
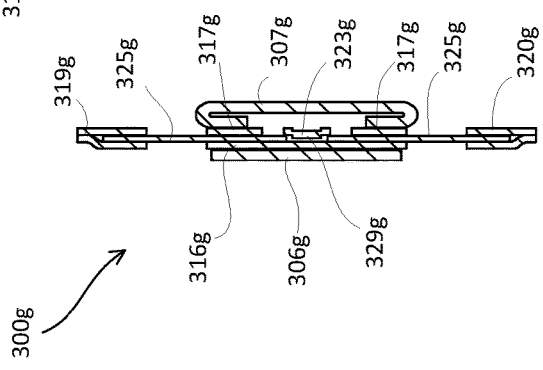
Figure 3D:
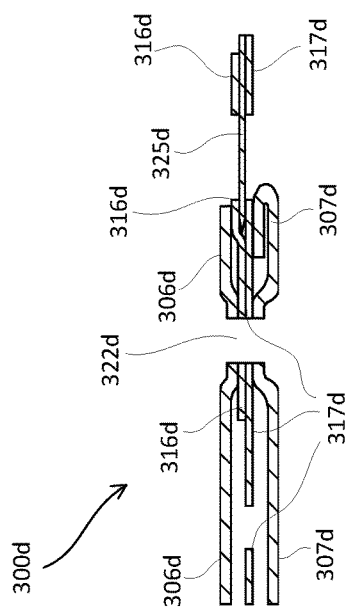
Figure 3E:
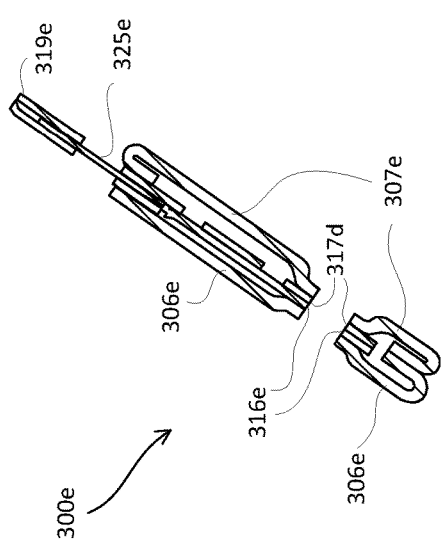

With reference to FIGS. 3A-3H, a safety utility knife assembly 300a-h, may include a replaceable safety blade 325a-e, 325g, 325h retained by a handle 305a-c. The safety utility knife assembly 300a-h may be similar to, for example, either the safety utility knife assembly 100 of FIG. 1 or the safety utility knife assembly 200 of FIG. 2. The cross-section view of the safety utility knife 300b of FIG. 3B is taken along the section-line 3B-3B of FIG. 3A. The cross-section view of the safety utility knife 300d of FIG. 3D is taken along the section-line 3D-3D of FIG. 3A. The cross-section view of the safety utility knife 300e of FIG. 3E is taken along the section-line 3E-3E of FIG. 3A. The cross-section view of the safety utility knife 300f of FIG. 3F is taken along the section-line 3F-3F of FIG. 3A. The cross-section view of the safety utility knife 300g of FIG. 3G is taken along the section-line 3G-3G of FIG. 3A.

The handle 305a-c may include a first half 306a-h secured to a second half 307a-h, a first aperture 308a, 308b, a second aperture 309a, 309b, a third aperture 310h, and a fourth aperture 311h. The safety utility knife assembly 300a-h may include a first blade retainer half 316a-h having a first wedge 331h and a second wedge 336h, and a second blade retainer half 317a-h having a blade release button 318a, 318b, a blade retention catch 323g, 323h, a first blade retainer pin 321f, 321h, and a second blade retainer pin 322f, 322h. The replaceable safety blade 325a-e, 325g, 325h may include a blade tab 328a-c, 328h and a blade retention aperture 329g, 329h. The replaceable safety blade 325a-e, 325g, 325h may be retained within the safety utility knife assembly 300a-h when the blade retention catch 323g, 323h is received within the blade retention aperture 329g, 329h. The safety utility knife assembly 300a-h may include a first blade throat 330h configured to, for example, limit access to a first cutting edge 326h. Similarly, the safety utility knife assembly 300a-h may include a second blade throat 335h configured to limit exposure to a second cutting edge 327h.

Turning to FIGS. 4A-4H, a handle 400a-h for use within a safety utility knife assembly (e.g., safety utility knife assembly 100 of FIG. 1, safety utility knife assembly 200 of FIG. 2, or safety utility knife assembly 300a-h of FIGS. 3A-3H) may include a first half 406e-h and a second half 407a-d. The first half 406e-h may be similar to, for example, the first half 106 of FIG. 1 or the first half 206 of FIG. 2. The second half 407a-d may be similar to, for example the second half 107 of FIG. 1 or the second half 207 of FIG. 2. The cross-section view of the first half 406h of FIG. 4H is taken along the section-line 4H-4H of FIG. 4E. The cross-section view of the first half 406g of FIG. 4G is taken along the section-line 4G-4G of FIG. 4E. The cross-section view of the second half 407c of FIG. 4C is taken along the section-line 4C-4C of FIG. 4A. The cross-section view of the second half 407e of FIG. 4E is taken along the section-line 4E-4E of FIG. 4A. The first half 406e-h may include a first aperture 408e, 408h, a second aperture 409e, a third aperture 411e, 411g, and a fourth aperture 412e, 412h. The second half 407a-d may include a first aperture 408a, 408g, a second aperture 411a, 411c, and a third aperture 412a, 412c.

With reference to FIGS. 5A-5G, first half 500a-g of a blade retainer (e.g., blade retainer 115 of FIG. 1) for use within the safety utility knife (e.g., safety utility knife assembly 100 of FIG. 1, safety utility knife assembly 200 of FIG. 2, or safety utility knife assembly 300a-h of FIGS. 3A-3H). The first half 500a-g may be similar to, for example, the first half 116 of FIG. 1, the first half 216 of FIG. 2, or the first half 316a-h of FIGS. 3A-3H. The cross-section view of the first half 500g of FIG. 5G is taken along the section-line 5G-5G of FIG. 5B. The cross-section view of the first half 500c of FIG. 5C is taken along the section-line 5C-5C of FIG. 5D.

Figure 3H:
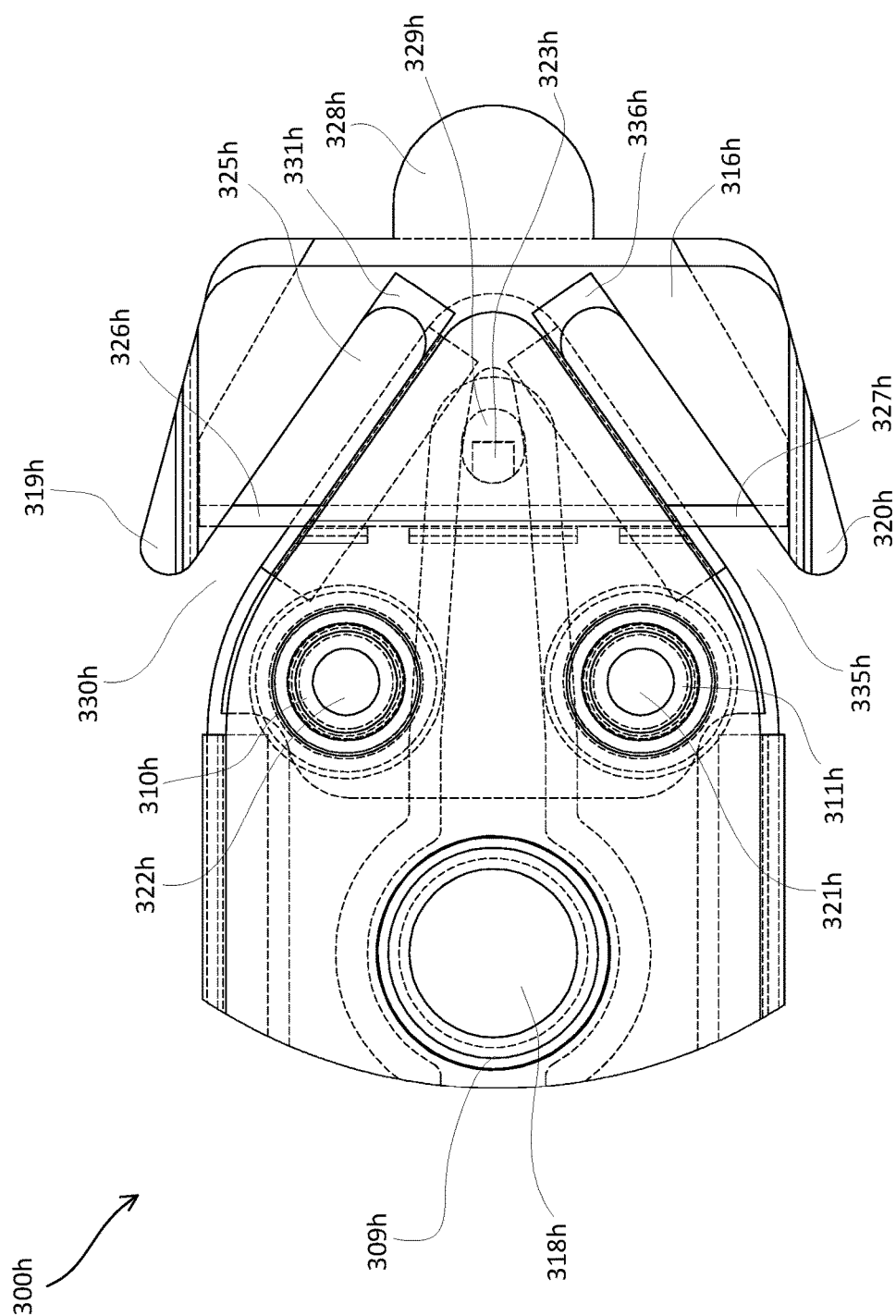

The first half 500a-g may include a first blade throat 530a, 530b, 530e configured to, for example, limit access to a first cutting edge (e.g., first cutting edge 126 of FIG. 1, first cutting edge 226, or first cutting edge 326h of FIG. 3H). Similarly, the first half 500a-g may include a second blade throat 535a, 535b, 535e configured to, for example, limit access to a second cutting edge (e.g., second cutting edge 127 of FIG. 1, second cutting edge 227, or second cutting edge 326h of FIG. 3H). The first half 500a-g may include a blade release button 518a-f and a blade retention catch 523a-f pivotally attached via a flex 543a-b, 543d. The first half 500a-g may include a first spacer/retainer 540a-f, a second spacer/retainer 541a-e, and a third spacer/retainer 542a-d, 542f. The first spacer/retainer 540a-f, the second spacer/retainer 541a-e, and the third spacer/retainer 542a-d, 542f may be configured to secure the first half 500a-g within an associated safety utility knife assembly (e.g., safety utility knife assembly 100 of FIG. 1, safety utility knife assembly 200 of FIG. 2, or safety utility knife assembly 300a-h of FIGS. 3A-3H).

The first half 500a-g may include a first wedge 532b, 532g and a second wedge 537b. As illustrated in FIG. 5G, the first wedge 532b, 532g may define a ten degree angle with respect to a surface 516g of the first half 500a-g. More generally, the first wedge 532b, 532g may define between a five and fifteen degree angle with respect to a surface 516g of the first half 500a-g. The second wedge 537b may be, for example, similar to the first wedge 532b, 532g.

As illustrated by the dashed line in FIG. 5A, the first half 500a-g, may include a finger/thumb blade access 524a configured to allow use of a safety blade (not shown in FIGS. 5A-5G), that, for example, does not include a blade tab (e.g., blade tab 128 of FIG. 1). In such an embodiment, a user may remove an associated replaceable safety blade by grasping a portion of the replaceable safety blade within the finger/thumb blade access 524a. Thus, an associated safety utility knife assembly (e.g., safety utility knife assembly 100 of FIG. 1, safety utility knife assembly 200 of FIG. 2, or safety utility knife assembly 300a-h of FIGS. 3A-3H) may include any readily available replaceable blade having a blade securing hole (e.g., blade securing hole 746c3 of FIG. 7C).

Turning to FIGS. 6A-6G, a second half 600a-g of a blade retainer (e.g., blade retainer 115 of FIG. 1) for use within the safety utility knife (e.g., safety utility knife assembly 100 of FIG. 1, safety utility knife assembly 200 of FIG. 2, or safety utility knife assembly 300a-h of FIGS. 3A-3H). The second half 600a-g may include a body 617a-g, a first blade throat 630a, 630c, and a second blade throat 635a, 635c. The second half 600a-g may include dimensions as shown in FIG. 6B, however, any the second half 600a-g may include any other suitable dimensions as long as an associated first half and an associated safety blade are provided with corresponding dimensions.

The second half 600a-g may include a first wedge 633a-b, 633e, 633g and a second wedge 638a-b. As illustrated in FIG. 6G, the first wedge 633a-b, 633e, 633g may define a ten degree angle with respect to a body 617g of the first half 600a-g. More generally, the first wedge 633a-b, 633e, 633g may define between a five and fifteen degree angle with respect to a surface 617g of the first half 600a-g. The second wedge 638a-b may be, for example, similar to the first wedge 633a-b, 633e, 633g.

As illustrated by the dashed line 624a in FIG. 6A, the second half 600a-g, may include a finger/thumb blade access 624a configured to allow use of a safety blade (not shown in FIGS. 6A-6G), that, for example, does not include a blade tab (e.g., blade tab 128 of FIG. 1). In such an embodiment, a user may remove an associated replaceable safety blade by grasping a portion of the replaceable safety blade within the finger/thumb blade access 624a. Thus, an associated safety utility knife assembly (e.g., safety utility knife assembly 100 of FIG. 1, safety utility knife assembly 200 of FIG. 2, or safety utility knife assembly 300a-h of FIGS. 3A-3H) may include any readily available replaceable blade having a blade securing hole (e.g., blade securing hole 746c3 of FIG. 7C).

With reference to FIGS. 7A and 7B, a safety blade 700a, 700b for use within the safety utility knife (e.g., safety utility knife assembly 100 of FIG. 1, safety utility knife assembly 200 of FIG. 2, or safety utility knife assembly 300a-h of FIGS. 3A-3H) may include a first cutting edge 726a, a second cutting edge 727a, 727b, and a blade tab 728a, 728b. The cutting edge (e.g., cutting edge 727b) may define a triangular shaped cross section. The first cutting edge 726a and the second cutting edge 727a, 727b may define a single, continuous cutting edge. The safety blade 700a, 700b may be similar to, for example, the safety blade 125, 225 of FIGS. 1 and 2, respectively. In lieu of the safety blade 700a, 700b, a blade in accordance with any of the blades described and mentioned in commonly assigned U.S. patent application Ser. No. 13/866,074, along with an associated blade retainer, may be used with the handle 400a-400h and 400j of FIGS. 4A-4H and 4J, respectively. The safety blade 700a, 700b may include dimensions as shown in FIGS. 7A and 7B or, alternatively, may include any suitable dimensions provided associated a blade retainer are provided with corresponding dimensions.

Figure 7C:
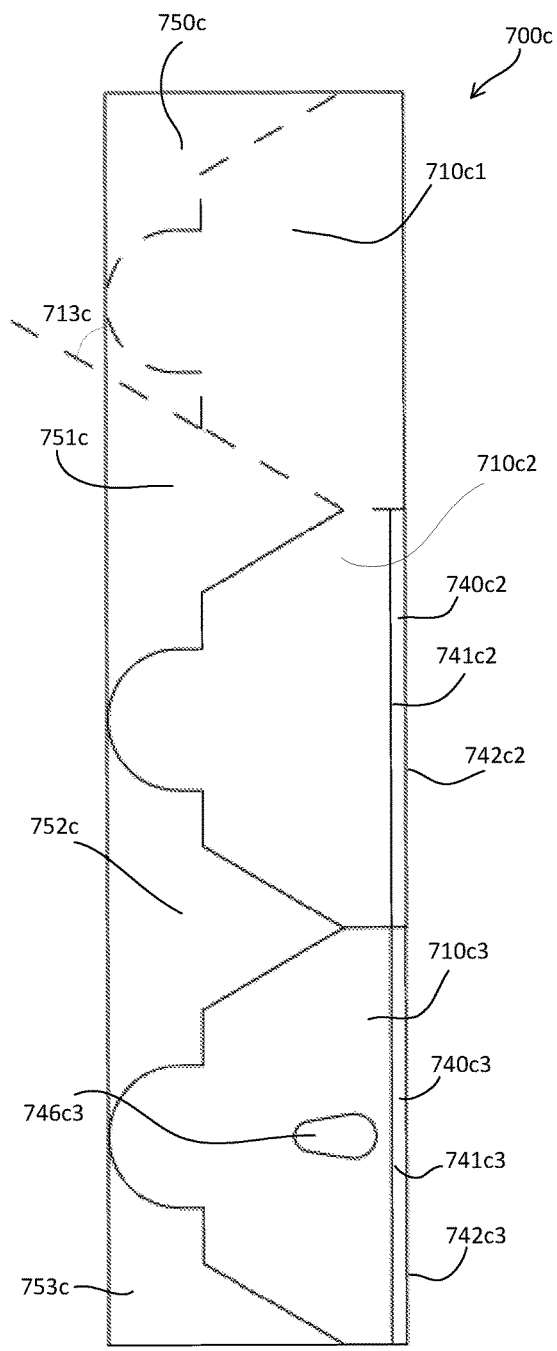
Figure 7D:
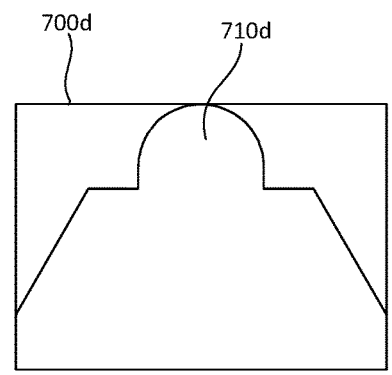
Figure 7E:
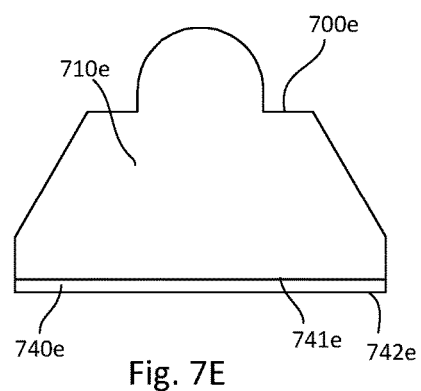
Figure 7F:
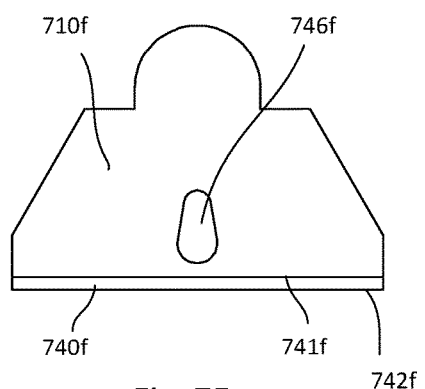

Turning to FIGS. 7C and 7G, a manufacturing method 700g for fabrication of the replaceable safety blade of FIGS. 7A and 7B for use in a safety utility knife assembly (e.g., safety utility knife assembly 100 of FIG. 1, safety utility knife assembly 200 of FIG. 2, or safety utility knife assembly 300a-h of FIGS. 3A-3H) may include providing a strip of blade material 700c (block 770g). A rough blade shape 710c1 may be formed by removing material 750a (block 775g). A blade securing hole 746c3 may be formed in the rough blade shape 710c1 by any suitable method, such as laser cutting, water jet cutting, machining, drilling, stamp shearing, etc. (block 780g). A sharpened portion 740c2, 740c3 may be formed by any suitable method, such as those disclosed in U.S. Pat. Nos. 4,265,055, 5,842,387, 6,860,796 or 8,206,199, for example (block 785g). The sharpened portion 740c2, 740c3 may define a shoulder 741c2, 741c3 and a cutting edge 742c2, 742c3. The blade 710c3 may be separated from the strip of blade material 700c by removing material 752c, 753c (block 790g). A blade end 751c may form an angle 713c with respect to a linear edge of the strip of blade material 700c of approximately 60°. Alternatively, the angle 713c may be between approximately 55° and approximately 70°.

With reference now to FIGS. 7D-7F and 7H, a method 700h of manufacturing a blade 710a, 710b for use in a safety utility knife assembly (e.g., safety utility knife assembly 100 of FIG. 1, safety utility knife assembly 200 of FIG. 2, or safety utility knife assembly 300a-h of FIGS. 3A-3H) may include blade blanks 700d that may be formed from a strip of blade material 700c (block 775h). Rough blade shapes 710d may be formed from the blade blanks 700d (block 780h). A blade securing hole 746f may be formed in the rough blade shape 710d by any suitable method, such as laser cutting, water jet cutting, machining, drilling, stamp shearing, etc. (block 785h). A sharpened portion 740e, 740f may be formed on a blade blank 710e, 710f by any suitable method, such as those disclosed in U.S. Pat. Nos. 4,265,055, 5,842,387, 6,860,796 or 8,206,199, for example (block 790h). The sharpened portion 740e, 740f may define a shoulder 741e, 741f and a cutting edge 742e, 742f.

A safety utility knife assembly (e.g., safety utility knife assembly 100 of FIG. 1, safety utility knife assembly 200 of FIG. 2, or safety utility knife assembly 300a-h of FIGS. 3A-3H) for use in, for example, a food industry may include a handle (e.g., handle 105 of FIG. 1), a replaceable safety blade retainer (e.g., replaceable safety blade retainer 115 of FIG. 1), and a replaceable safety blade (e.g., replaceable safety blade 125 of FIG. 1) that are each made from, for example, metal such that any portion of, or all of, the safety utility knife assembly 100 that is, for example, dropped into a batch of associated food may be detected and/or removed via associated metal detection/removal equipment.

A safety utility knife assembly (e.g., safety utility knife assembly 100 of FIG. 1, safety utility knife assembly 200 of FIG. 2, or safety utility knife assembly 300*a-h* of FIGS. 3A-3H) may include various features as described, for example, in commonly assigned U.S. patent application Ser. No. 12/620,999, which was filed on Nov. 18, 2009, and U.S. patent application Ser. No. 13/866,074, which was filed on Apr. 19, 2013, the disclosures of which are incorporated in their entireties herein by reference thereto.

The figures depict preferred embodiments of safety blades for use in utility knife assemblies, utility knife assemblies and methods of manufacturing. One skilled in the art will readily recognize from the corresponding written description that alternative embodiments of the structures and methods illustrated herein may be employed without departing from the principles described.

Upon reading this disclosure, those of skill in the art will appreciate still additional alternative structural and functional designs for safety blades for use in utility knife assemblies, utility knife assemblies and methods of manufacturing. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the apparatuses and methods disclosed herein without departing from the spirit and scope defined in the appended claims.

What is claimed is:

1. A safety utility knife assembly, comprising:
   a handle having an aperture and a blade retainer receptacle;
   a blade retainer having an upwardly extending blade release button and an upwardly extending blade catch, wherein the blade retainer includes a first half and a second half, and wherein the blade release button is received within the aperture and accessible therefrom when the blade retainer is inserted into the handle; and
   a replaceable safety blade having a blade securing aperture, wherein a cutting edge of the replaceable safety blade extends perpendicular to a longitudinally extending axis of the handle, wherein the replaceable safety blade is removable from the safety utility knife assembly when a user presses on the blade release button to disengage the blade catch from the blade securing aperture for allowing removable of the safety replaceable blade from the blade retainer wherein the blade retainer further comprises a longitudinally extending resilient arm having one fixed end and an opposing distal end, the blade catch is disposed at the distal end, and the blade release button is disposed between the fixed end and the distal end, such that when the user presses on the blade release button, the resilient arm flexes at the fixed end, and the blade catch moves in the same direction as the blade release button to release the replaceable safety blade.

2. The safety utility knife assembly as in claim 1, wherein the cutting edge is a first cutting edge, and the safety utility knife assembly further comprises a first blade throat configured to limit access to the first cutting edge of the replaceable safety blade when the replaceable safety blade is secured within the safety utility knife assembly.

3. The safety utility knife assembly as in claim 2, further comprising a second blade throat configured to limit access to a second cutting edge of the replaceable safety blade when the replaceable safety blade is secured within the safety utility knife assembly.

4. The safety utility knife assembly as in claim 3, wherein the first and second cutting edges define a single, continuous cutting edge.

5. The safety utility knife assembly as in claim 1, wherein the replaceable safety blade includes a continuous piece of metal that is selected from the group consisting of: carbon steel, heat treated metal, heat treated carbon steel and stainless steel.

6. The safety utility knife assembly as in claim 1, wherein the cutting edge has a triangular shaped cross section.

7. The safety utility knife assembly as in claim 1, wherein the blade retainer includes a first wedge and a second wedge.

8. A safety utility knife assembly, comprising:
   a handle having an aperture;
   a blade retainer having an upwardly extending blade release button and an upwardly extending blade catch, wherein the blade release button is received within the aperture and accessible therefrom when the blade retainer is inserted into the handle; and
   a replaceable safety blade having a blade securing aperture, wherein a cutting edge of the replaceable safety blade extends perpendicular to a longitudinally extending axis of the handle, wherein the replaceable safety blade is removable from the safety utility knife assembly when a user presses on the blade release button to disengage the blade catch from the blade securing aperture for allowing removable of the safety replaceable blade from the blade retainer.

9. The safety utility knife assembly as in claim 8, wherein the cutting edge is a first cutting edge, and the safety utility knife assembly further comprises a first blade throat configured to limit access to the first cutting edge of the replaceable safety blade when the replaceable safety blade is secured within the safety utility knife assembly.

10. The safety utility knife assembly as in claim 9, further comprising a second blade throat configured to limit access to a second cutting edge of the replaceable safety blade when the replaceable safety blade is secured within the safety utility knife assembly.

11. The safety utility knife assembly as in claim 10, wherein the first and second cutting edges define a single, continuous cutting edge.

12. The safety utility knife assembly as in claim 8, wherein the replaceable safety blade includes a continuous piece of metal that is selected from the group consisting of: carbon steel, heat treated metal, heat treated carbon steel and stainless steel.

13. The safety utility knife assembly as in claim 8, wherein the cutting edge has a triangular shaped cross section.

14. A method of manufacturing a safety utility knife assembly as recited in claim 8, the method comprising;
   providing a handle having an aperture;
   providing a blade retainer having a blade release button extending upwardly and a blade catch, wherein the blade release button is received within the aperture and accessible therefrom when the blade retainer is inserted into the handle;
   providing a strip of blade material;
   forming a rough blade shape from the strip of blade material;
   forming a blade securing aperture in the rough blade shape;

forming a blade cutting edge in the rough blade shape to form a blade; and inserting the blade in the blade retainer such that the blade catch is received within the blade securing aperture.

15. The method as in claim 14, wherein the inserting step having the blade cutting edge oriented perpendicular to a longitudinally extending axis of the handle.

16. The method as in claim 14, further comprising selecting the strip of blade material from the group consisting of: carbon steel, heat treated metal, heat treated carbon steel, stainless steel and ceramic.

17. The method as in claim 14, further comprising forming the blade cutting edge to have a triangular shaped cross section.

18. The method as in claim 14, further comprising having the blade securing aperture centered with respect to opposing ends of the replaceable safety blade.

19. The method as in claim 14, further comprising having each end of the safety utility blade to include at least a portion extending perpendicular to the cutting edge.

20. The method as in claim 19, further comprising having each end of the safety utility blade to include at least a portion extending at an angle with respect to the cutting edge.

* * * * *